(12) United States Patent
Carr

(10) Patent No.: US 8,026,714 B2
(45) Date of Patent: Sep. 27, 2011

(54) ACCELEROMETER WITH ENHANCED DC STABILITY

(75) Inventor: Dustin Wade Carr, Albuquerque, NM (US)

(73) Assignee: Symphony Acoustics, Inc., Rio Rancho, NM (US)

( * ) Notice: Subject to any disclaimer, the term of this patent is extended or adjusted under 35 U.S.C. 154(b) by 253 days.

(21) Appl. No.: 12/397,680

(22) Filed: Mar. 4, 2009

(65) Prior Publication Data
US 2009/0228235 A1   Sep. 10, 2009

Related U.S. Application Data

(60) Provisional application No. 61/034,418, filed on Mar. 6, 2008.

(51) Int. Cl.
*G01P 15/00* (2006.01)
*G01P 15/03* (2006.01)

(52) U.S. Cl. .............. 324/162; 324/750.02; 324/754.23; 324/762.01; 702/141; 73/382 R; 73/510

(58) Field of Classification Search ................... 324/162; 702/141; 73/382 R, 832 R
See application file for complete search history.

(56) References Cited

U.S. PATENT DOCUMENTS

| | | | |
|---|---|---|---|
| 6,705,167 B2 * | 3/2004 | Kvisteroey et al. | 73/514.38 |
| 7,013,731 B1 * | 3/2006 | Szeremeta et al. | 73/593 |
| 7,258,011 B2 * | 8/2007 | Nasiri et al. | 73/514.32 |
| 2005/0140356 A1 * | 6/2005 | Inglese et al. | 324/162 |
| 2008/0282801 A1 * | 11/2008 | Yin et al. | 73/514.01 |
| 2011/0031959 A1 * | 2/2011 | Konno | 324/162 |

* cited by examiner

*Primary Examiner* — Huy Q Phan
*Assistant Examiner* — Emily Chan
(74) *Attorney, Agent, or Firm* — DeMont & Breyer, LLC

(57) ABSTRACT

An accelerometer with improved immunity to sensitivity drift is disclosed. In some embodiments, the accelerometer comprises an actuator that induces a known acceleration on a reference frame. A signal based on this known acceleration is used to calibrate the accelerometer to mitigate the effects due to at least one of sensitivity drift, D.C. bias drift, sense laser wavelength drift, and resonant frequency drift.

17 Claims, 4 Drawing Sheets

US 8,026,714 B2

ACCELEROMETER WITH ENHANCED DC STABILITY

CROSS REFERENCE TO RELATED APPLICATIONS

This case claims priority to: U.S. Provisional Patent Application Ser. No. 61/034,418, filed Mar. 6, 2008, which is incorporated by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to sensors in general, and, more particularly, to accelerometers.

BACKGROUND OF THE INVENTION

An accelerometer provides an output signal based on an acceleration that acts upon it. Accelerometers are used in a wide variety of applications, such as inertial guidance systems, automobile crash detection systems, video game controllers, and shipping container shock sensors.

An accelerometer with very high sensitivity can be used as a gravity sensor. Gravity sensors are used in such area as geological surveying, oil field exploration, homeland security, and seismology.

The advent of Micro-Electro Mechanical Systems (MEMS) technology has ushered in a new era of accelerometers. A typical MEMS-based accelerometer includes a sensing element that is based on a proof mass attached to a reference frame by means of resilient tether (e.g., a spring element or spring system). An acceleration of the reference frame or the presence of a gravitational field causes a displacement of the proof mass relative to the reference frame. A transducer converts this displacement into an output signal.

The sensitivity of an accelerometer (expressed in terms of Volts or Amperes per unit of acceleration) is dependent upon its signal-to-noise ratio (SNR) and output drift. In the absence of an acceleration, the output signal of the accelerometer typically exhibits a constant voltage or current level. This steady-state output value is referred to as a D.C. bias. Unfortunately, DC bias is subject to drift over time and temperature. In addition, accelerometers are subject to sensitivity drift with temperature. Such drifts contribute to the noise on the output signal, thereby decreasing the signal-to-noise ratio of the accelerometer. This adversely affects the overall sensitivity of the device.

Approaches to mitigating the effects of bias stability have been developed in the prior art. In some cases, temperature sensors and microcontrollers are integrated with the accelerometer. During operation, the temperature-induced drift can be removed from the output signal by means of a look-up table or mathematical solution. Unfortunately, this leads to significant added cost and complexity.

Other approaches rely on the integration of analog correction circuitry with the accelerometer. Unfortunately, it is very hard to tune the correction circuitry to accommodate variations from accelerometer to accelerometer.

Still other approaches employ active temperature stabilization. In such approaches, the accelerometer is held at a temperature above the ambient by means of a heating element. This dramatically increases power consumption for the accelerometer however. Low power consumption is particularly desirable for mobile applications.

In some cases, a user-employable "reset" button is provided to enable a user to zero the accelerometer when it is in a state of zero acceleration. This, however, is impractical in many applications.

Finally, AC-coupling an accelerometer can eliminate bias drift all-together. Unfortunately, in many applications DC-coupling is required or highly desirable (e.g., tilt sensors, geological surveying, inertial navigation, etc.).

SUMMARY OF THE INVENTION

The present invention provides an accelerometer with high SNR and high sensitivity without some of the disadvantages of the prior art. Some embodiments of the present invention are particularly well-suited for use in devices such as gravity sensors and accelerometers in applications such as geological surveying, oil field exploration, inertial navigation, homeland defense, and shock detection.

Sensors in accordance with the present invention provide measurement sensitivity that is improved over the prior art by including a reference signal suitable for sensor calibration. As a result, embodiments of the present invention can mitigate the effects of:

i. D.C. bias drift; or
  ii. resonant frequency drift; or
  iii. sensitivity drift; or
  iv. wavelength noise associated with displacement sensors used to monitor acceleration; or
  v. any combination of i, ii, iii, and iv.

In some embodiments, the accelerometer provides two signals: (1) a first signal based on motion of a mass that is resiliently connected to a first reference frame; and (2) a second signal based on an induced motion of the first reference frame relative to a second reference frame (e.g., a substrate). To generate the second signal, a known motion that exhibits a known acceleration is induced on the first reference frame. This known motion is then detected directly and forms the basis of the second signal. The accelerometer can then be calibrated based on the second signal. In some embodiments, calibration of the accelerometer is enabled by inducing a periodic motion of the first reference frame at a frequency that is outside the expected range of frequencies of the target acceleration sensed by the accelerometer.

In some embodiments, the second signal is generated by detecting motion of the first reference frame using an optically resonant cavity. The first reference frame is oscillated along a direction with amplitude that exceeds the optical response of the cavity. In other words, the first reference frame translates a distance that results in at least two optical resonant transmission peaks being detected. This enables more accurate calibration of the sensor.

In some embodiments, motion of the first reference frame is induced by an impulse of force. The impulse response of the first reference frame is measured periodically, and the resonant frequency is observed. In some embodiments, a swept-sine measurement is used to detect drift in the resonant frequency of the mass.

An embodiment of the present invention comprises: a substrate; a first element; an actuator, wherein the actuator induces a first motion of the first element with respect to the substrate; a second element, wherein the second element comprises a first physical adaption for moving with a second motion in response to an acceleration; a first sensor, wherein the first sensor provides a first signal that is based on the first motion; and a second sensor, wherein the second sensor provides a second signal that is based on the second motion.

DETAILED DESCRIPTION

Figure 1:
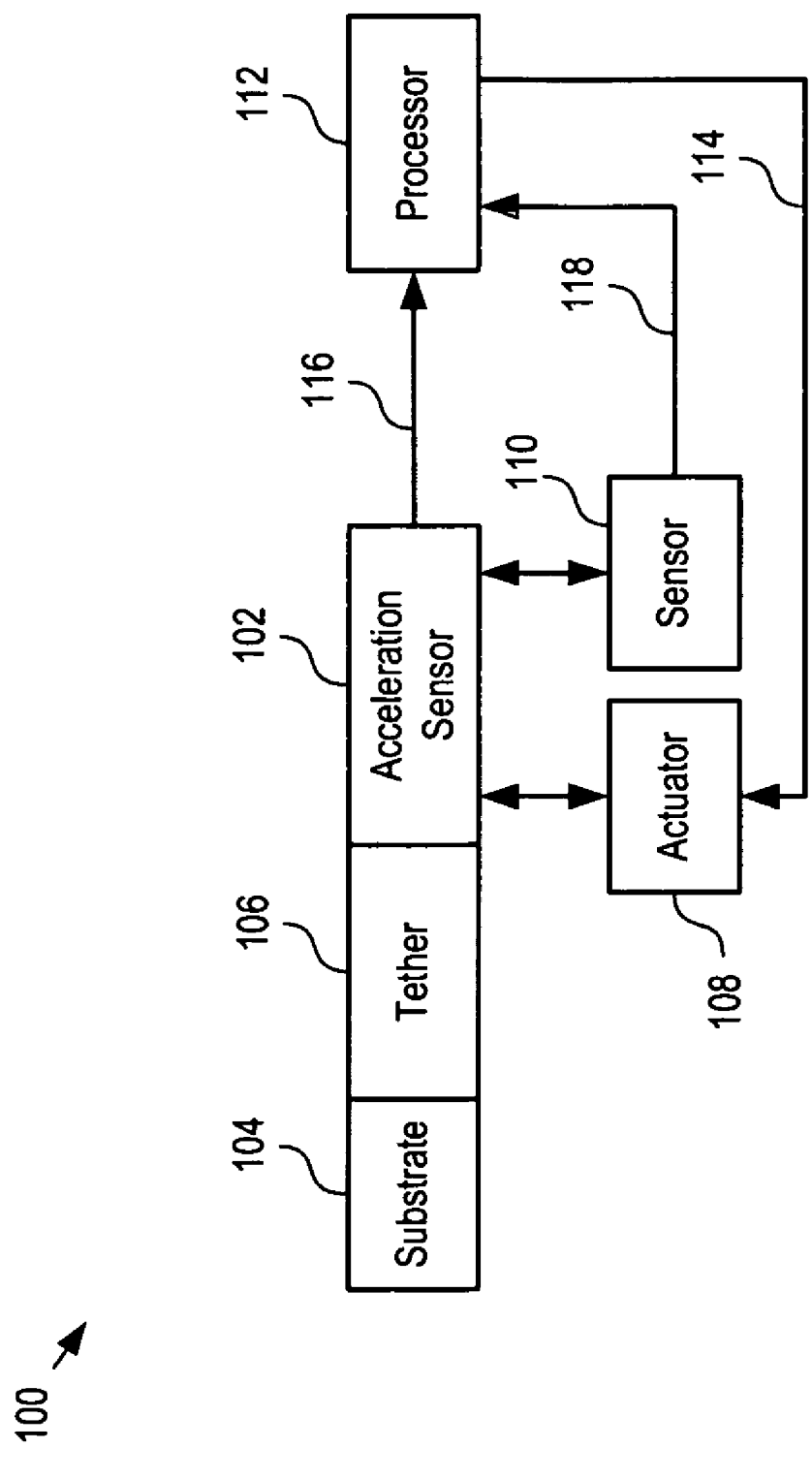
FIG. 1 depicts a block diagram of details of an accelerometer in accordance with an illustrative embodiment of the present invention.

FIG. 1 depicts a block diagram of details of an accelerometer in accordance with an illustrative embodiment of the present invention. Accelerometer 100 comprises acceleration sensor 102, substrate 106, actuator 108, sensor 110, and processor 112.

Acceleration sensor 102 is an accelerometer that provides signal 110. Signal 110 is an electrical signal that is based on the motion of a proof mass relative to a reference frame. Acceleration sensor 102 is described in more detail below and with respect to FIGS. 2A and 2B.

Substrate 104 is a rigid platform suitable for providing a reference frame for motion of acceleration sensor 102. Acceleration sensor 102 is supported above substrate 104 by tether 106. Tether 106 has sufficient mechanical strength to support acceleration sensor 102, but is resilient to enable motion of accelerometer 102 with respect to substrate 104. Suitable materials for substrate 104 and tether 106 include, without limitation, semiconductors, semiconductor compounds, dielectrics, glasses, polymers, ceramics, metals, and composite materials.

Actuator 108 is an electrostatic actuator suitable for inducing motion of acceleration sensor 102, relative to substrate 104. Alternative actuators suitable for use in actuator 108 include, without limitation, piezoelectric, magnetic, thermal, microfluidic, pneumatic, hydraulic, shape memory alloy, and magnetostrictive actuators.

Sensor 110 is a sensor that provides signal 118 based on the motion of acceleration sensor 102 relative to substrate 104. Sensors suitable for use as sensor 110 include, without limitation, optical, magnetic, electrostatic, capacitive, induction, piezoelectric, and piezoresistive sensors.

Processor 112 is a general purpose processor capable of executing software routines, computation, providing drive signal 114, and computing a value for acceleration based on received signals 110 and 118.

Figure 2A:
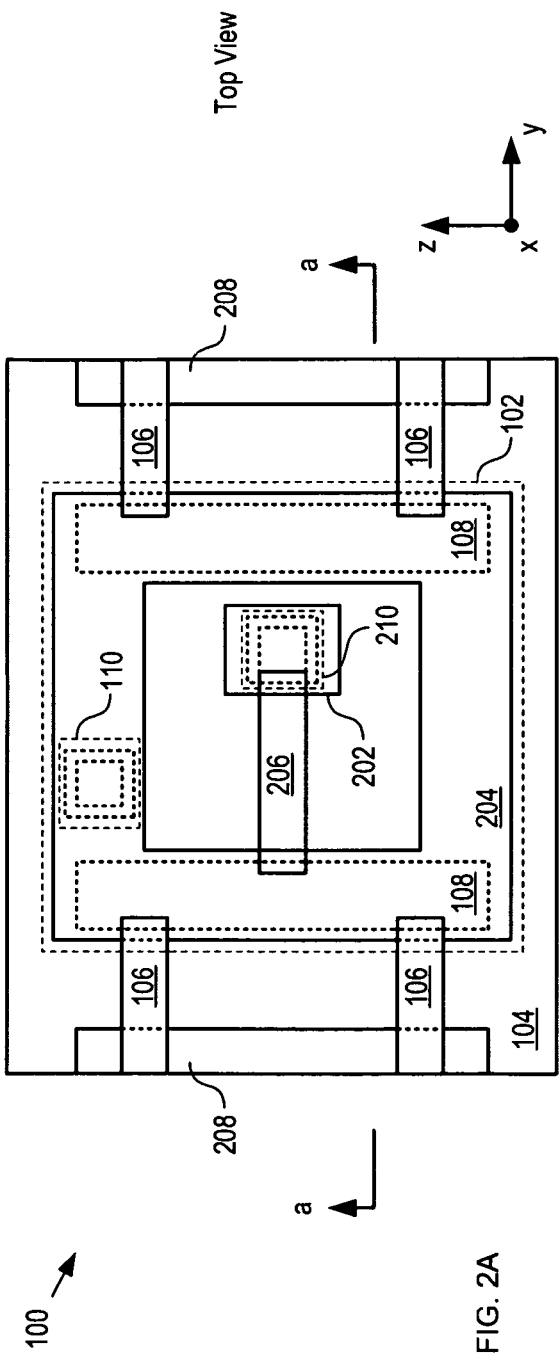
FIGS. 2A and 2B depict a top and side view, respectively, of details of accelerometer 100.
Figure 2B:
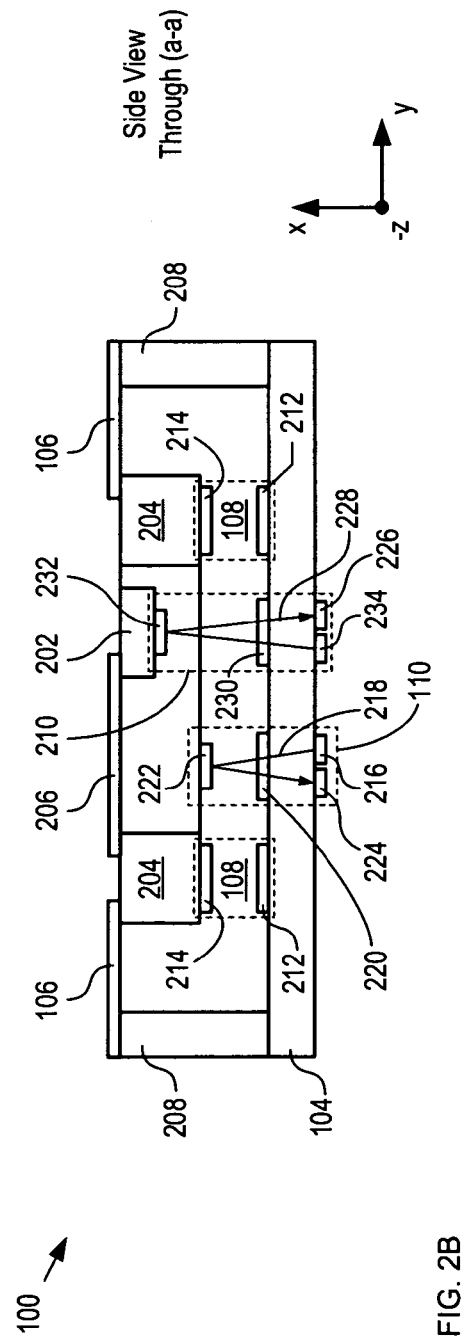

FIGS. 2A and 2B depict a top and side view, respectively, of details of accelerometer 100. Accelerometer 100 comprises acceleration sensor 102, tethers 106, anchors 208, actuators 108, and sensor 110.

Acceleration sensor 102 comprises mass 202, frame 204, tether 206, and mass sensor 210. Acceleration sensor 102 is supported above substrate 104 by virtue of tethers 106, which extend from supports 208.

Mass 202 is a rigid block of material having a known mass. Mass 202 is attached to frame 204 by tether 206.

Tether 206 is a resilient element that enables motion of mass 202 along the x-direction, as shown.

Frame 204 is an annulus of rigid material. Frame 204 is supported above substrate 104 via tethers 106. In some embodiments, frame 204 does not surround mass 202. In some embodiments, frame 204 is a simple shape, such as a block having a square, circular, elliptical, or irregular shape.

The specific shapes and sizes of mass 202, frame 204 and tether 206 are design considerations that are application dependent. For most applications, mass 202 and/or frame 204 would have a circular or square shape, wherein mass 202 has a diameter or width within the range of approximately 0.5 millimeters (mm) to approximately 20 mm, while frame 204 would be within the range of approximately 3 mm to approximately 22 mm on a side. The illustrative embodiment depicts one exemplary design comprising: a mass 202 having a square shape of approximately 4 mm on a side and a thickness of approximately 0.5 mm; a frame 204 having a square annular shape of approximately 6 millimeters on a side with an annular width of approximately 0.5 mm and a thickness of approximately 0.5 mm; and four tethers 206, each having a length of approximately 0.5 mm and a thickness of 0.1 mm. Further, although the illustrative embodiment comprises four tethers 106, it will be clear to one skilled in the art, after reading this specification, how to specify, make, and use embodiments of the present invention that comprise any number of tethers that support acceleration sensor 102 above substrate 104.

Suitable materials for mass 202, frame 204, and tether 206 include, without limitation, semiconductors, semiconductor compounds, dielectrics, glasses, polymers, ceramics, metals, and composite materials. In some embodiments, mass 202, frame 204, and tether 206 are formed from a continuous layer of material.

Figure 3:
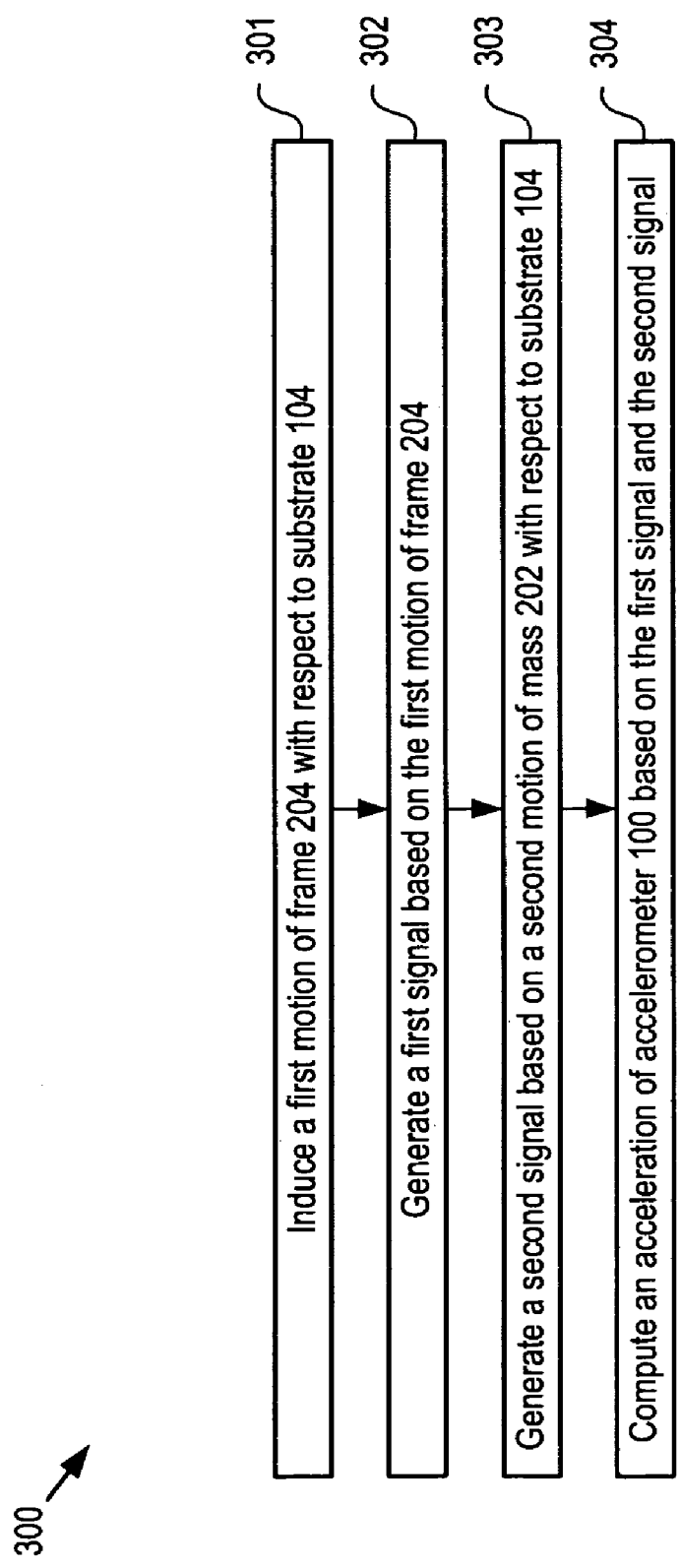
FIG. 3 depicts a method for sensing acceleration in accordance with the illustrative embodiment of the present invention.

FIG. 3 depicts a method for sensing acceleration in accordance with the illustrative embodiment of the present invention. Method 300 is described with continuing reference to FIGS. 1, 2A, and 2B.

Method 300 begins with operation 301, wherein an oscillation of frame 204 with respect to substrate 104 is induced along the x-direction by periodic excitation of actuators 108.

Each of actuators 108 comprises a lower electrode 212 and an upper electrode 214. Upon application of a suitable voltage between lower electrodes 212 and upper electrodes 214, frame 204 is attracted toward substrate 104. In other words, frame 204 moves in the negative x-direction, as shown. When frame 204 moves along the x-direction, tethers 106 are stretched and a tensile strain is induced in the tethers.

Upon removal of the voltage applied between electrodes 212 and 214, the tension in tethers 106 acts as a restoring force that pulls frame 204 away from substrate 104. In other words, frame 204 moves in the positive x-direction, as shown, when the voltage is removed from electrodes 212 and 214. By repeatedly applying and removing the voltage between electrodes 212 and 214, therefore, oscillation of frame 204 along the x-direction is induced. This oscillation imparts a known acceleration on frame 204 in the x-direction.

In some embodiments, actuator 108 oscillates frame 204 with a frequency that is well below the resonant frequency of acceleration sensor 102. This resonant frequency is defined by the combined mechanical and material characteristics of mass 202, frame 204, and tether 206. Well below this resonant frequency, the amount of deflection of mass 202 along the x-direction, $\Delta x_m$, is determined by $$\Delta x_m = \frac{a}{\omega_0^2}, \quad (1)$$

where $\alpha$ is the applied acceleration and $\omega_0$ is the resonant frequency.

For a sinusoidal displacement of frame 204, $x_e = x_{e0} \sin \omega t$, where $x_{e0}$ is the maximum deflection and $\omega$ is the frequency of excitation, an applied acceleration of $\alpha = -\omega^2 x_e$ is produced. The displacement of mass 202, therefore, can be described as:

$$\Delta x = \frac{-\omega^2}{\omega_0^2} x_e. \quad (2)$$

For operation of the accelerometer at a frequency below the resonance of the tether-mass system, the displacement of frame 204 is always larger than that of mass 202. In fact, for some embodiments, for frequencies below 100 Hz, arbitrarily low accelerations can be applied and sensed.

In some embodiments, actuators 108 apply an impulse function to frame 204. As a result, accelerometer 100 exhibits a "ring-down behavior." From this ring-down behavior, the resonant frequency of the accelerometer can be computed. This enables a mitigation of the effect of resonant frequency drift on the sensitivity of the accelerometer.

In some alternative embodiments, motion of acceleration sensor 102 relative to substrate 104 is induced by an actuator that is not directly connected to acceleration sensor 102. In such embodiments, frame 204 is driven via an actuator that is operatively coupled to frame 204 through a motion transducer, such as a lever arm. In some embodiments, this motion transducer provides de-amplification of the actuator motion. As a result, effects of actuator noise on the performance of the accelerometer can be mitigated.

At operation 302, sensor 110 provides signal 118. Signal 118 is based on acceleration associated with the oscillation of frame 204 with respect to substrate 104. Sensor 110 comprises an interferometric optical sensor including a first optically resonant cavity, laser 216 and detector 224. The first optically resonant cavity is defined by mirrors 220 and 222. Laser 216 emits light signal 218, a portion of which is reflected by the first optically resonant cavity and detected by detector 224. Detector 224 provides signal 118 (not shown for clarity), which is based on the intensity of detected light signal 218. The intensity of detected light signal 218 is based on the amount of light reflected by the first optically resonant cavity. This amount is based on the spacing between mirrors 220 and 222 (i.e., the cavity length of the first optically resonant cavity).

In some embodiments, actuators 108 induce displacements of frame 204 that exceed an optical period of sensor 110. As a result, multiple reflection peaks are available for the first optically resonant cavity. This enables accurate calibration of actuator 108, which can be performed on a regular basis if desired (e.g., once per hour, etc.).

At operation 303, mass sensor provides signal 116. Signal 116 is based on motion of mass 202 with respect to substrate 104. Mass 202 moves along the x-direction in a predictable manner in response to the oscillation of frame 204 along the x-direction. This predictable motion is perturbed, however, by any external acceleration along the x-direction imparted on accelerometer 100.

Mass sensor 210 comprises an interferometric optical sensor including a second optically resonant cavity, laser 234 and detector 226. The second optically resonant cavity is defined by mirrors 230 and 232. Laser 234 emits light signal 228, a portion of which is reflected by the second optically resonant cavity and detected by detector 226. Detector 226 generates an electrical signal that is based on the intensity of detected light signal 228. The intensity of detected light signal 228 is based the amount of light reflected by the second optically resonant cavity. This amount is based on the spacing between mirrors 230 and 232 (i.e., the cavity length of the second optically resonant cavity).

In some embodiments, lasers 216 and 234 and detectors 220 and 230 are located on top of substrate 104 (i.e., between frame 204 and substrate 104). In some embodiments, at least one of sensor 110 and mass sensor 210 comprises collimating and/or beam steering optics.

It will be clear to those of ordinary skill in the art that the paths of light signals 218 and 228 are merely representative of the operation of their respective optically resonant cavities, as the reflection and transmission characteristics of an optically resonant cavity are more complex that as depicted.

In some embodiments, high-resolution displacement sensors other than optically resonant cavities are used to sense the relative positions of the frame and mass with respect to the substrate. Suitable technologies for use as high-resolution sensors include, without limitation, optical, magnetic, electrostatic, capacitive, induction, piezoelectric, and piezoresistive sensors.

At operation 304, acceleration of accelerometer 100 along the x-direction is computed by processor 112. The acceleration is computed based on signals 116 and 118.

Figure 4:
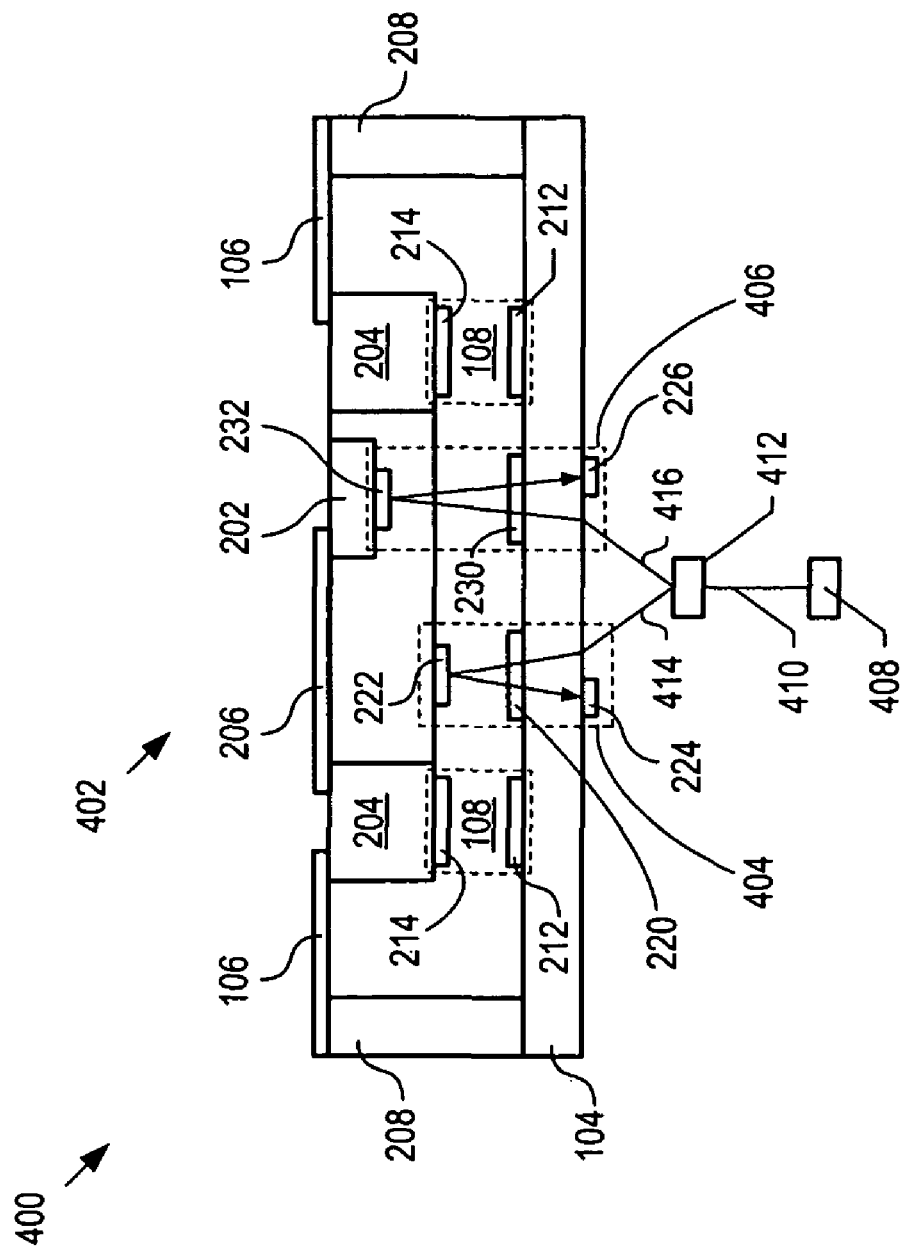
FIG. 4 depicts a cross-sectional view of details of an accelerometer in accordance with an alternative embodiment of the present invention.

FIG. 4 depicts a cross-sectional view of details of an accelerometer in accordance with an alternative embodiment of the present invention. Accelerometer 400 comprises acceleration sensor 402, substrate 104, actuators 108, sensor 404, and processor 112.

Acceleration sensor 402 is analogous to acceleration sensor 102; however, acceleration sensor 402 comprises mass sensor 406 rather than mass sensor 210. Mass sensor 406 is described in more detail below in conjunction with sensor 404.

Operation of accelerometer 400 is analogous to operation of accelerometer 100; however, in accelerometer 400, sensors 404 and 406 receive light signals 414 and 416, which are generated by splitting light emitted by a single laser source.

Laser 408 emits light signal 410, which is suitable for operation of sensor 404 and mass sensor 406. Light signal 410 is received by beamsplitter 412, which distributes it into light signals 414 and 416.

Since both sensor 404 and mass sensor 406 receive light from the same source, accelerometer 400 is less sensitive to drift of the wavelength of light received by sensor 404 and mass sensor 406. Such wavelength drift would affect the output of both sensors equally; therefore, a combination of these outputs can be used to effectively null the effects of wavelength noise.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   a substrate;
   a first element;
   an actuator, wherein the actuator induces a first motion of the first element with respect to the substrate;
   a second element, wherein the second element comprises a first physical adaption for moving with a second motion in response to an acceleration;
   a first sensor, wherein the first sensor provides a first signal that is based on the first motion; and
   a second sensor, wherein the second sensor provides a second signal that is based on the second motion, wherein the second sensor comprises;
   (a) a first optically resonant cavity, wherein the first optically resonant cavity has a first cavity length that is based a first separation between the second element and the substrate, and wherein the first optically resonant cavity receives light and distributes it into a first reflected signal and a first transmitted signal based on the first cavity length; and
   (b) a first detector, wherein the first detector provides the second signal, and wherein the second signal is based on one of the first reflected signal and the first transmitted signal.

2. The apparatus of claim 1 wherein the first motion is periodic.

3. The apparatus of claim 1 wherein the actuator excites the first motion with an impulse of force.

4. The apparatus of claim 1 further comprising a processor, wherein the processor computes a value for the acceleration based on the first signal and the second signal.

5. The apparatus of claim 1 wherein the first sensor comprises:
   a second optically resonant cavity, wherein the second optically resonant cavity has a second cavity length that is based a second separation between the first element and the substrate, and wherein the second optically resonant cavity receives light and distributes it into a second reflected signal and a second transmitted signal based on the second cavity length; and
   a second detector, wherein the second detector provides the first signal, and wherein the first signal is based on one of the second reflected signal and the second transmitted signal.

6. The apparatus of claim 5 wherein:
   the first element comprises a first surface;
   the second element comprises a second surface; and
   the substrate comprises a third surface and a fourth surface;
   wherein the first surface and the third surface collectively define the second optically resonant cavity, and wherein the second surface and the fourth surface collectively define the first optically resonant cavity.

7. The apparatus of claim 1 wherein the acceleration is based on a gravitational field.

8. An apparatus comprising:
   a substrate;
   a first element;
   a first tether, wherein the first tether physically couples the substrate and the first element, and wherein the first tether enables a first motion of the first element with respect to the substrate;
   an actuator, wherein the actuator induces the first motion;
   a first sensor, wherein the first sensor provides a first signal that is based on the first motion, and wherein the first sensor comprises;
   (a) a first optically resonant cavity, wherein the first optically resonant cavity has a first instantaneous cavity length that is based on a separation between the first element and the substrate, and wherein the first optically resonant cavity receives a first light signal and provides a second light signal that is based on the first instantaneous cavity length; and
   (b) a first detector, wherein the first detector provides the first signal based on the second light signal;
   a mass;
   a second tether, wherein the second tether physically couples the mass and the first element, and wherein the second tether enables the mass to move with a second motion in response to an acceleration; and
   a second sensor, wherein the second sensor provides a second signal that is based on the second motion.

9. The apparatus of claim 8 wherein the first motion is a periodic motion.

10. The apparatus of claim 8 wherein the second sensor comprises:
    a second optically resonant cavity, wherein the second optically resonant cavity has a second instantaneous cavity length that is based on a separation between the mass and the substrate, and wherein the second optically resonant cavity receives a third light signal and provides a fourth light signal that is based on the second instantaneous cavity length; and
    a second detector, wherein the second detector provides the second signal based on the fourth light signal.

11. The apparatus of claim 10 further comprising:
    a source of light, wherein the source provides an input light signal; and
    a beam splitter, wherein the beam splitter receives the input light signal and provides the first light signal and the second light signal.

12. The apparatus of claim 8 wherein the acceleration is based on a gravitational field.

13. A method comprising:
    inducing a first motion of a first element relative to a substrate;
    providing a first signal based on the first motion;
    enabling a mass to move with a second motion in response to an acceleration, wherein the mass is enabled to move with respect to the first element, and wherein the second motion is relative to the substrate;
    providing a first optical signal to a first optically resonant cavity having a first cavity length, wherein the first cavity length is based on a separation between the mass and the substrate, and wherein the first optically resonant cavity provides a second optical signal whose intensity is based on the first cavity length; and
    receiving the second optical signal at a first detector, wherein the first detector provides a second signal based on the second optical signal; and
    computing a value for the acceleration based on the first signal and the second signal.

14. The method of claim 13 further comprising:
    providing a third optical signal to a second optically resonant cavity having a second cavity length, wherein the second cavity length is based on a separation between the first element and the substrate, and wherein the second optically resonant cavity provides a fourth optical signal whose intensity is based on the second cavity length; and receiving the fourth optical signal at a second detector, wherein the second detector provides the first signal based on the fourth optical signal.

15. The method of claim 13 wherein the first motion is induced as a periodic motion.

16. The method of claim 13 wherein the first motion is induced with an impulse of force.

17. The method of claim 13 wherein the mass is enabled to move with the second motion in response to an acceleration that is based on a gravitational field.

\* \* \* \* \*